United States Patent
Miranda et al.

(10) Patent No.: US 11,545,029 B2
(45) Date of Patent: Jan. 3, 2023

(54) DISTRACTION-SENSITIVE TRAFFIC DRIVE-OFF ALERTS

(71) Applicant: Atieva, Inc., Newark, CA (US)

(72) Inventors: Eliseo Miranda, Boston, MA (US); Shrief M. Salama, Fremont, CA (US)

(73) Assignee: Atieva, Inc., Newark, CA (US)

( * ) Notice: Subject to any disclaimer, the term of this patent is extended or adjusted under 35 U.S.C. 154(b) by 11 days.

(21) Appl. No.: 17/248,986

(22) Filed: Feb. 16, 2021

(65) Prior Publication Data

US 2022/0262246 A1    Aug. 18, 2022

(51) Int. Cl.
   *G08G 1/0962* (2006.01)
   *B60Q 9/00* (2006.01)
   *G06V 20/59* (2022.01)

(52) U.S. Cl.
   CPC .......... *G08G 1/09626* (2013.01); *B60Q 9/00* (2013.01); *G06V 20/597* (2022.01)

(58) Field of Classification Search
   CPC ..... G08G 1/09626; B60Q 9/00; G06V 20/597
   See application file for complete search history.

(56) References Cited

U.S. PATENT DOCUMENTS

| | | |
|---|---|---|
| 9,248,796 B2 | 2/2016 | Takahashi et al. |
| 9,638,155 B2 | 5/2017 | Kato et al. |
| 2009/0192686 A1 | 7/2009 | Niehsen et al. |
| 2014/0100734 A1* | 4/2014 | Yamashiro ............... G08G 1/22 701/23 |
| 2014/0125474 A1* | 5/2014 | Gunaratne ............ B60Q 9/008 340/439 |
| 2014/0241578 A1 | 8/2014 | Nonaka et al. |
| 2015/0191084 A1 | 7/2015 | Fuehrer |
| 2015/0206430 A1 | 7/2015 | Yang et al. |
| 2016/0068159 A1 | 3/2016 | Zou |
| 2016/0193998 A1 | 7/2016 | Yellambalase |
| 2018/0126901 A1* | 5/2018 | Levkova .............. G06V 20/597 |
| 2019/0283764 A1* | 9/2019 | Morimoto .............. B60R 21/00 |
| 2021/0158697 A1* | 5/2021 | Schottland ............... G08G 1/08 |

FOREIGN PATENT DOCUMENTS

WO     2015200224 A2    12/2015

OTHER PUBLICATIONS

International Search Report and Written Opinion for PCT Application No. PCT/US2092/070677, dated May 5, 2022, 9 pages.

* cited by examiner

*Primary Examiner* — Brian Wilson
(74) *Attorney, Agent, or Firm* — Brake Hughes Bellermann LLP

(57) ABSTRACT

A computer-implemented method comprises: determining, by a computer system of a first vehicle, that a traffic standstill criterion is met, the traffic standstill criterion including that the first vehicle is stationary in traffic and that a second vehicle immediately in front of the first vehicle is also stationary; receiving, by the computer system, a camera output relating to a driver of the first vehicle, the camera output generated by a camera positioned in a passenger cabin of the first vehicle; assigning, by the computer system, a distraction level for the driver based on the camera output, the distraction level selected from among multiple distraction levels; determining, by the computer system, that a criterion for a drive-off event is met; and selecting, by the computer system and based on the distraction level assigned for the driver, a first alert level from among multiple alert levels regarding the drive-off event.

24 Claims, 6 Drawing Sheets

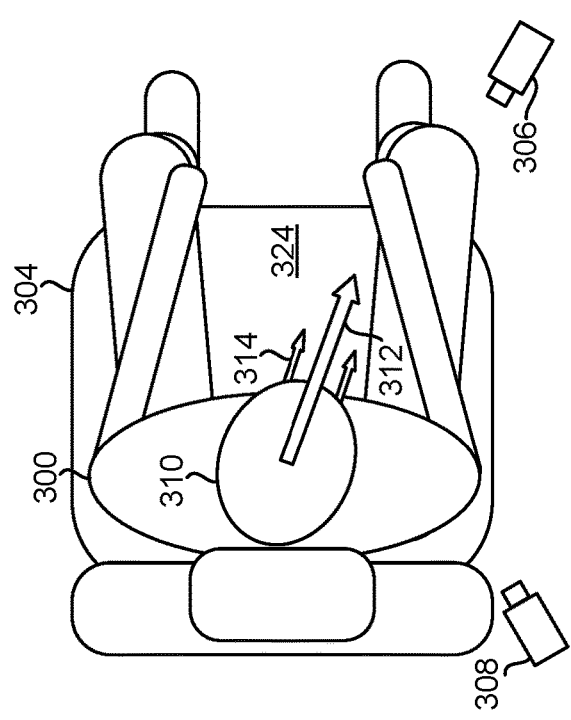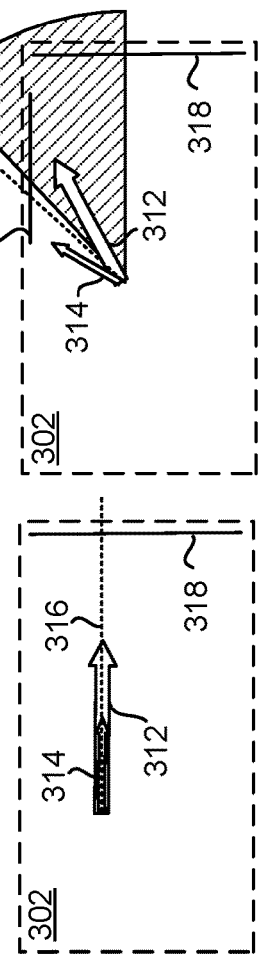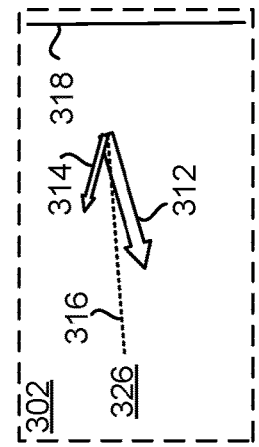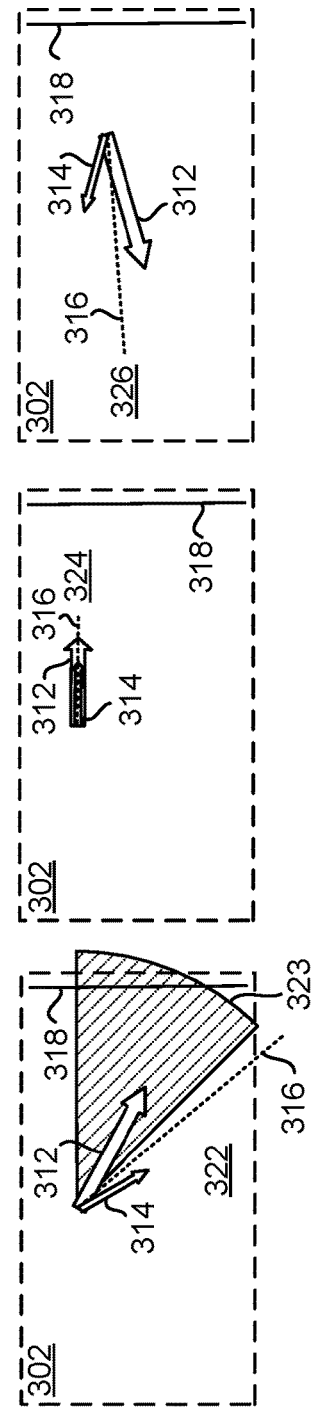
FIG. 3A
FIG. 3B
FIG. 3C
FIG. 3D
FIG. 3E
FIG. 3F

DISTRACTION-SENSITIVE TRAFFIC DRIVE-OFF ALERTS

TECHNICAL FIELD

This document relates to distraction-sensitive traffic drive-off alerts.

BACKGROUND

There are multiple scenarios where a vehicle in traffic may come to a standstill behind one or more other vehicles, such as in a traffic jam or at a stoplight. It is often up to the driver of the vehicle to be cognizant of when the traffic again begins to flow, so that the vehicle can continue to move forward at that time. If the driver delays resuming the vehicle's forward motion, a gap develops in the traffic which is typically undesirable. While some approaches have been tried for issuing a warning to the driver in such situations, they may be unnecessarily obtrusive and can degrade the driver's concentration level or detract from the driving experience.

SUMMARY

In a first aspect, a computer-implemented method comprises: determining, by a computer system of a first vehicle, that a traffic standstill criterion is met, the traffic standstill criterion including that the first vehicle is stationary in traffic and that a second vehicle immediately in front of the first vehicle is also stationary; receiving, by the computer system, a camera output relating to a driver of the first vehicle, the camera output generated by a camera positioned in a passenger cabin of the first vehicle; assigning, by the computer system, a distraction level for the driver based on the camera output, the distraction level selected from among multiple distraction levels; determining, by the computer system, that a criterion for a drive-off event is met; and selecting, by the computer system and based on the distraction level assigned for the driver, a first alert level from among multiple alert levels regarding the drive-off event.

Implementations can include any or all of the following features. The first alert level includes at least one of an audio alert or a visual alert. The computer-implemented method further comprises determining whether an alert suspension criterion is met. The alert suspension criterion takes into account events during a predefined time period. The predefined time period comprises a time since a most recently issued alert, and wherein the alert suspension criterion comprises that the first vehicle has exceeded a threshold speed since the most recently issued alert. The predefined time period comprises a time since the first vehicle was turned on, and wherein the alert suspension criterion comprises that the first vehicle has exceeded a threshold speed since the first vehicle was turned on. The criterion for the drive-off event takes into account whether a distance between the first and second vehicles exceeds a threshold distance. The threshold distance is based at least in part on a length of the first vehicle. The threshold distance is defined as an initial distance plus the length of the first vehicle, wherein the initial distance is defined as the distance between the first and second vehicles when the traffic standstill criterion is met. The computer-implemented method further comprises determining, after the traffic standstill criterion is met and before the criterion for the drive-off event is met, that the first vehicle moves relative to the second vehicle, and in response updating the threshold distance with a new distance between the first and second vehicles. The computer-implemented method further comprises determining, after the traffic standstill criterion is met and before the criterion for the drive-off event is met, that the second vehicle moves toward the first vehicle, wherein the threshold distance is not updated with a shorter distance between the first and second vehicles. The criterion for the drive-off event further comprises that a brake pedal of the first vehicle is depressed. The computer-implemented method further comprises determining that the brake pedal is no longer depressed, and inhibiting an alert unless a vehicle dynamic system is holding the first vehicle at a standstill. The computer-implemented method further comprises determining, based on the camera output and in response to determining that the second vehicle meets the criterion for the drive-off event, a head direction of the driver and an eye gaze direction for the driver, wherein the distraction level is assigned based on the head direction and the eye gaze direction. A first distraction level is assigned for the driver in response to the head direction and the eye gaze direction indicating that the driver is currently not looking through a windshield of the first vehicle and is looking through a driver side window of the first vehicle. A second distraction level is assigned for the driver in response to the head direction and the eye gaze direction indicating that the driver is currently not looking through a windshield of the first vehicle and is looking toward a front passenger seat of the first vehicle or toward a lap of the driver, wherein the second distraction level represents more distraction than the first distraction level. A third distraction level is assigned for the driver in response to the head direction and the eye gaze direction indicating that the driver is currently not looking through a windshield of the first vehicle and is looking toward a rear of the first vehicle, wherein the third distraction level represents more distraction than the second distraction level. The criterion for the drive-off event takes into account whether an acceleration of the second vehicle exceeds a threshold acceleration. The computer-implemented method further comprises selecting a second alert level based on a timeout event after selecting the first alert level and not based on the camera output. The computer-implemented method further comprises taking into account an angle or range of angles of a viewing direction, and based on the angle or range of angles waiting a predefined time before generating an alert. For a lowest distraction level no alert is generated, and for all other distraction levels a same type of alert is generated. The computer-implemented method further comprises determining whether to suppress at least one alert. The determination whether to suppress the alert comprises taking into account a speed of the first vehicle.

In a second aspect, a computer program product is tangibly embodied in a non-transitory storage medium, the computer program product including instructions that when executed cause a processor to perform operations, the operations comprising: determining, by a computer system of a first vehicle, that a traffic standstill criterion is met, the traffic standstill criterion including that the first vehicle is stationary in traffic and that a second vehicle immediately in front of the first vehicle is also stationary; receiving, by the computer system, a camera output relating to a driver of the first vehicle, the camera output generated by a camera positioned in a passenger cabin of the first vehicle; assigning, by the computer system, a distraction level for the driver based on the camera output, the distraction level selected from among multiple distraction levels; determining, by the computer system, that a criterion for a drive-off event is met;

and selecting, by the computer system and based on the distraction level assigned for the driver, a first alert level from among multiple alert levels regarding the drive-off event.

BRIEF DESCRIPTION OF DRAWINGS

FIGS. 3A-3F schematically show a driver and a passenger compartment of a vehicle.

Like reference symbols in the various drawings indicate like elements.

DETAILED DESCRIPTION

Figure 1A:
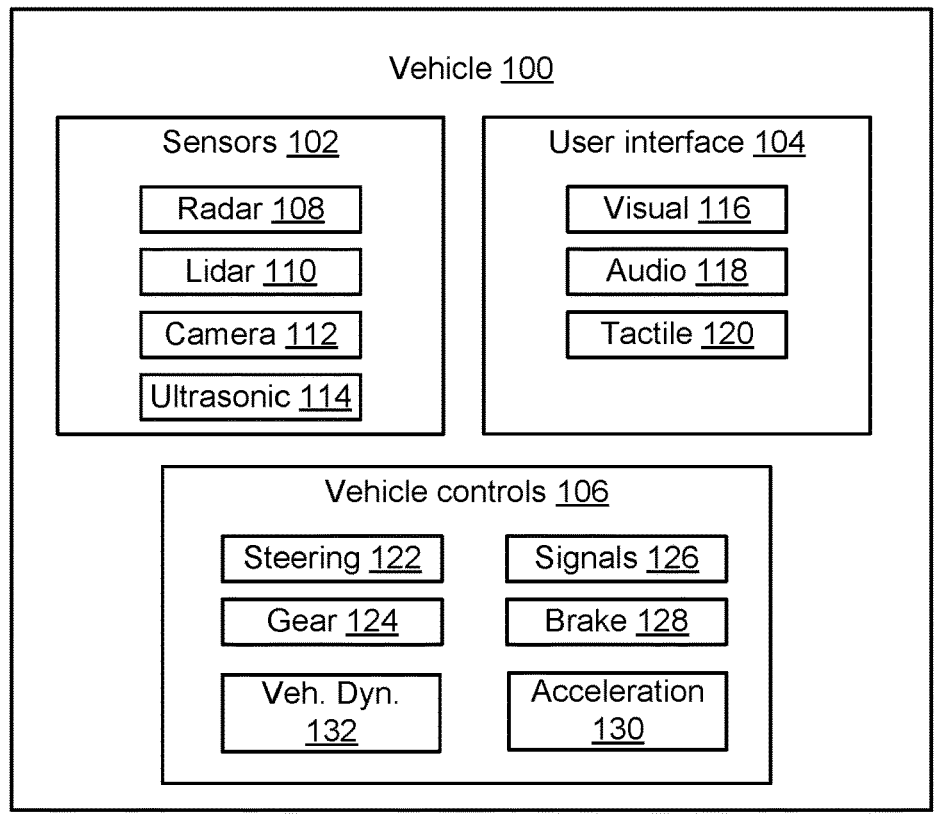
FIGS. 1A-1B show example of vehicle systems.

This document describes examples of systems and techniques providing distraction-sensitive traffic drive-off alerts. In some implementations, an alert for the situation when traffic again begins to flow can be tailored to the current distraction level that the vehicle detects in the driver. This can provide a more nuanced approach to the interaction between a vehicle and its driver, and can provide a more focused driving experience.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, the vehicle that is the subject of the example is sometimes referred to as the "ego vehicle". One or more other vehicles are sometimes referred to as a "target vehicle".

Examples herein refer to traffic. As used herein, traffic refers to any situation where two or more vehicles are using the same road, highway, or street. Moreover, a vehicle being standstill in traffic refers to any situation where the vehicle is stationary and is not parked (e.g., a vehicle with an automatic transmission has not been placed in Park mode).

Examples herein refer to a drive-off event. As used herein, a drive-off event refers to when a target vehicle positioned immediately in front of the ego vehicle moves in a certain way relative to the ego vehicle. For example, the target vehicle can create a space of a certain length to the ego vehicle. As another example, the target vehicle can undergo at least a predefined acceleration.

Examples herein refer to a sensor. A sensor is configured to detect an event and/or a change in one or more aspects of its environment and output signal(s) reflecting the detection. As illustrative examples only, a sensor can indicate one or more of a distance between the vehicle and an object, a speed of the vehicle, a trajectory of the vehicle, or an acceleration of the vehicle. Examples of sensors that can be used with one or more embodiments include, but are not limited to: a light sensor (e.g., a camera); a scanning system (e.g., lidar); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a temperature sensor (e.g., a primary or secondary thermometer); a pressure sensor (e.g., for ambient air or a component of the vehicle); a humidity sensor (e.g., a rain detector); or a seat occupancy sensor.

Figure 1B:
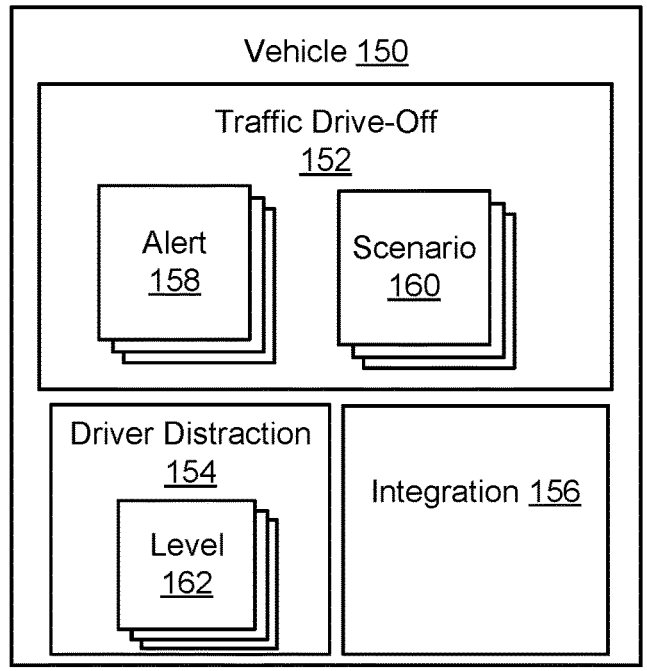

FIGS. 1A-1B show example of vehicle systems 100 and 150. The vehicle systems 100 and 150 can be used with one or more other examples described elsewhere herein. The vehicle system 100 and/or 150 can be used for providing distraction-sensitive traffic drive-off alerts. The vehicle system 100 includes sensors 102, a user interface 104, and vehicle controls 106. Other aspects that the vehicle system 100 may include, and other components of the vehicle where the vehicle system 100 may be implemented, are omitted here for simplicity.

The sensors 102 can include a radar 108. In some implementations, the radar 108 can include any object detection system that is based at least in part on radio waves. For example, the radar 108 can be oriented in a forward direction relative to the vehicle and can be used for detecting at least a distance to one or more other objects (e.g., another vehicle).

The sensors 102 can include a lidar 110. In some implementations, the lidar 110 can include any object detection system that is based at least in part on laser light. For example, the lidar 110 can be oriented in any direction relative to the vehicle and can be used for detecting at least a distance to one or more other objects (e.g., another vehicle).

The sensors 102 can include a camera 112. In some implementations, the camera 112 can include any image sensor whose signal(s) the vehicle system 100 takes into account. For example, the camera 112 can be oriented in any direction relative to the vehicle and can be used for detecting vehicles, lanes, lane markings, and/or road signage.

The sensors 102 can include an ultrasonic sensor 114. In some implementations, the ultrasonic sensor 114 can include any transmitter, receiver, and/or transceiver used in detecting at least the proximity of an object based on ultrasound. For example, the ultrasonic sensor 114 can be positioned at or near an outer surface of the vehicle.

At least one of the sensors 102 can generate an output that is taken into account in detecting a traffic standstill and/or a level of distraction in a driver. For example, the output of two or more sensors (e.g., the outputs of the radar 108, the lidar 110, and the camera 112) can be combined to determine a distance between an ego vehicle and a target vehicle. In some implementations, one or more other types of sensors can additionally or instead be included in the sensors 102.

The user interface 104 can include a visual interface 116. In some implementations, the visual interface 116 can include at least one display device in the passenger compartment of the vehicle. For example, the visual interface 116 can include a touchscreen device and/or an instrument cluster display.

The user interface 104 can include an audio interface 118. In some implementations, the audio interface can include one or more speakers positioned in the passenger compartment. For example, the audio interface 118 can at least in part operate together with an infotainment system in the vehicle.

The user interface 104 can include a tactile interface 120. In some implementations, the tactile interface 120 is configured to generate tactile or haptic output that can be perceived by a human. For example, the tactile interface 120 can be designed to serve as an alert to the driver.

In some implementations, one or more other types of interface can additionally or instead be included in the user interface 104.

The vehicle controls 106 can include a steering control 122. In some implementations, the driver controls the trajectory of the vehicle by adjusting a steering angle of at least one wheel by way of manipulating the steering control 122. The steering control 122 can be configured for controlling the steering angle though a mechanical connection between the steering control 122 and the adjustable wheel, or can be part of a steer-by-wire system.

The vehicle controls 106 can include a gear control 124. In some implementations, the driver uses the gear control 124 to choose from among multiple operating modes of a vehicle (e.g., a Drive mode, a Neutral mode, or a Park mode). For example, the gear control 124 can be used to control an automatic transmission in the vehicle.

The vehicle controls 106 can include signal controls 126. In some implementations, the signal controls 126 can control one or more signals that the vehicle can generate. For example, the signal controls 126 can control a turn signal and/or a horn of the vehicle.

The vehicle controls 106 can include brake controls 128. In some implementations, the brake controls 128 can control one or more types of braking systems designed to slow down the vehicle, stop the vehicle, and/or maintain the vehicle at a standstill when stopped. For example, the brake controls 128 can be actuated by the driver using a brake pedal.

The vehicle controls 106 can include an acceleration control 130. In some implementations, the acceleration control 130 can control one or more types of propulsion motor of the vehicle. For example, the acceleration control 130 can control the electric motor(s) and/or the internal-combustion motor(s) of the vehicle.

The vehicle controls 106 can include a vehicle dynamic system 132. In some implementations, the vehicle dynamic system 132 can control one or more functions of the vehicle in addition to, or in the absence of, or in lieu of, the drive's control. For example, when the vehicle comes to a stop on a hill, the vehicle dynamic system 132 can hold the vehicle at standstill if the driver does not activate the brake control 128 (e.g., step on the brake pedal).

Turning now to FIG. 1B, the vehicle system 150 includes a traffic drive-off system 152, a driver distraction system 154, and an integration system 156 between the traffic drive-off system 152 and the driver distraction system 154. The traffic drive-off system 152 can be configured for generating an alert according to any of multiple alert levels 158. Each of the alert levels 158 can be associated with generating an alert according to one or more modes of alerting. For example, one of the alert levels 158 can involve providing an alert on the visual interface 116. As another example, another of the alert levels 158 can involve providing an alert using the audio interface 118. As another example, another of the alert levels 158 can involve providing an alert using the tactile interface 120. As another example, another of the alert levels 158 can involve providing an alert using a combination of two or more interfaces of the user interfaces 104. For example, one of the alert levels 158 can include at least one of an audio alert (e.g., by the audio interface 118) or a visual alert (e.g., by the visual interface 116). As another example, one of the alert levels 158 can include at least one audio alert (e.g., by the audio interface 118), a visual message (e.g., a message presented by the visual interface 116), and an animation (e.g., generated by the visual interface 116).

The traffic drive-off system 152 can be configured to operate based on any of multiple scenarios 160. For example, the traffic drive-off system 152 can determine whether a traffic standstill criterion is met (e.g., whether the vehicle of the vehicle system 150, and the vehicle immediately in front of it, are stationary). As another example, the traffic drive-off system 152 can determine that a criterion for a drive-off event is met (e.g., that the vehicle immediately in front has moved a certain distance away, or is moving forward with at least a predefined acceleration). The traffic drive-off system 152 can be implemented using one or more components described below with reference to FIG. 6.

In some implementations, the driver distraction system 154 can be configured to process one or more sensor outputs (e.g., a camera signal) relating to the driver and assign any of multiple distraction levels 162 to the driver. For example, the driver distraction system 154 can determine the driver's head direction and/or eye gaze direction. Doing so can allow the driver distraction system 154 to take into account how distracted the driver is (e.g., if the driver is subject to only a minor distraction of a fleeting nature, or if the driver is significantly distracted in a way that will likely continue unless the driver is provided a significant prompt. In some implementations, the distraction levels 162 can comprise numerical values (e.g., referred to as 1, 2, 3, . . . , and so on). The driver distraction system 154 can be implemented using one or more components described below with reference to FIG. 6.

In some implementations, the integration system 156 can be configured to provide an interface between the traffic drive-off system 152 and the driver distraction system 154. In some implementations, information is passed in at least one direction between the traffic drive-off system 152 and the driver distraction system 154. For example, the driver distraction system 154 can inform the traffic drive-off system 152 which of the distraction levels 162 is currently assigned to the driver, and the traffic drive-off system 152 can use this information in selecting an alert level among the alert levels 158. As another example, the traffic drive-off system 152 can inform the driver distraction system 154 when information about a driver distraction level is needed. For example, this can affect when, and/or how intensively, the driver distraction system 154 performs determinations regarding the driver's distraction. The integration system 156 can be implemented using one or more components described below with reference to FIG. 6.

Figure 2:
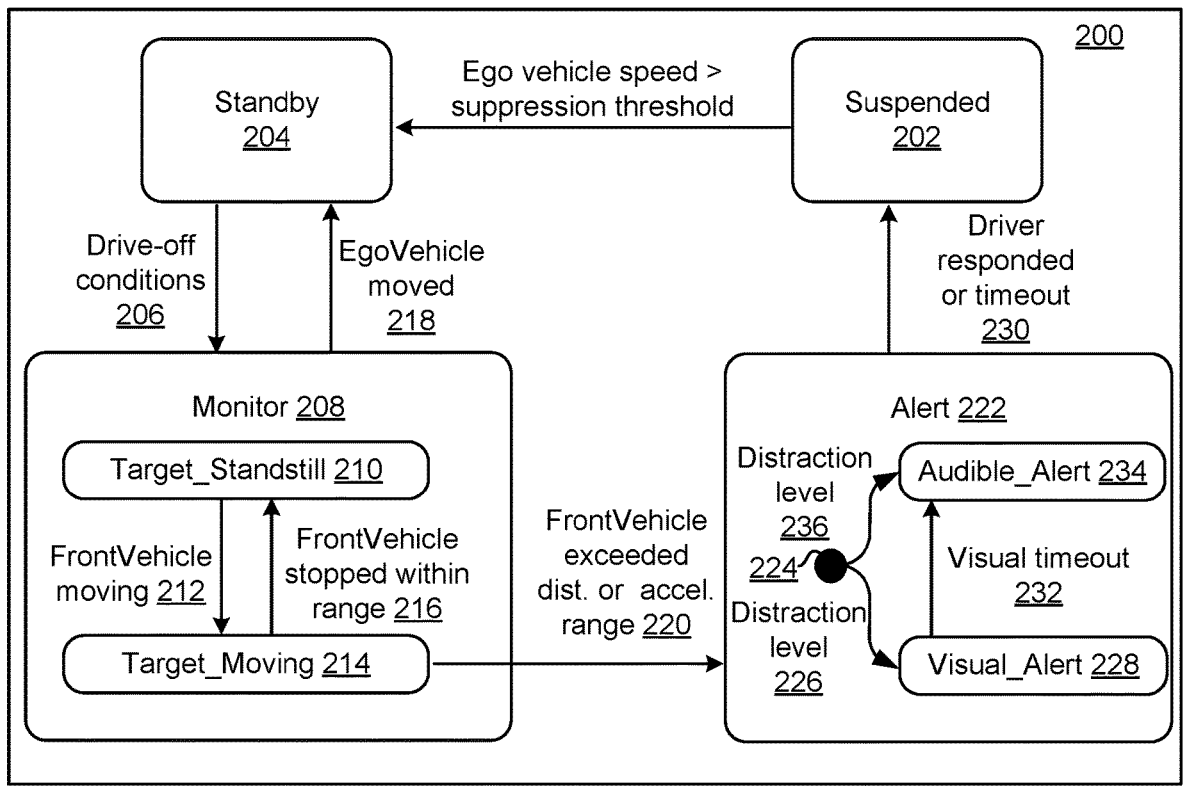
FIG. 2 shows an example of a state diagram.

FIG. 2 shows an example of a state diagram 200. The state diagram 200 can be used with one or more other examples described elsewhere herein. The state diagram 200 schematically represents states that a system (e.g., the vehicle system 150 in FIG. 1B) can assume, each such state corresponding to a particular configuration of information in a program or a machine. The state diagram 200 does not necessarily represent all possible states that a vehicle system can assume.

The state diagram 200 includes a suspended state 202. The vehicle system can be in the suspended state 202 based on a determination that an alert suspension criterion is met (e.g., the issuance of alerts is suspended while the criterion is met). In some implementations, events during a predefined time period can be taken into account in evaluating whether an alert suspension criterion is met. For example, the alert suspension criterion can be met starting at the time of a most recently issued alert (e.g., being one of the alert levels 158 in FIG. 1B) and continuing until the vehicle exceeds a threshold speed. Such an approach can avoid issuing an alert too soon after a previous alert, so that it may not yet be desirable to begin issuing alerts in the event of the driver delaying the resumption of the vehicle's forward motion. On the contrary, upon the threshold speed being exceeded, the alert suspension criterion may no longer be met. As such, the vehicle system may the leave the suspended state 202, such as by entering a standby state 204.

As another example, the alert suspension criterion can be met starting at the time when the vehicle is turned on and continuing until the vehicle exceeds a threshold speed. Such an approach can avoid issuing an alert while not enough time has passed since the driving began where it may be desirable to begin issuing alerts in the event of the driver delaying the resumption of the vehicle's forward motion. On the contrary, upon the threshold speed being exceeded, the alert suspension criterion may no longer be met. As such, the vehicle system may the leave the suspended state 202, such as by entering the standby state 204.

In the standby state 204 the vehicle system can wait until one or more criteria are met. In some implementations, the vehicle system (e.g., the traffic drive-off system 152 in FIG. 1B) can determine whether a traffic standstill criterion is met. The traffic standstill criterion can represent the occurrence of a sufficient departure from a scenario of active driving (e.g., where drive-off alerts are not to be generated) that it is warranted to begin monitoring whether conditions justify issuance of one or more alerts. For example, the traffic standstill criterion can include that an ego vehicle having the vehicle system is stationary in traffic, and that a target vehicle immediately in front of the ego vehicle is also stationary. The meeting of such a criterion can trigger a drive-off conditions transition 206. For example, the drive-off conditions transition 206 can lead to a monitor state 208 in the state diagram 200.

In the monitor state 208, the vehicle system can monitor the target vehicle in one or more respects. The monitoring can be based on processing output of one or more of the sensors 102 (FIG. 1A). In some implementations, the monitoring can determine whether the target vehicle moves relative to the ego vehicle (e.g., moves forward or backward). For example, upon determination that the target vehicle is (e.g., remains) at a standstill, the vehicle system can enter a Target_Standstill state 210 within the monitor state 208. The vehicle system can remain in the Target_Standstill state 210 for as long as it is determined (e.g., using one or more sensors) that the target vehicle is stationary.

Based on output from one or more sensors it can be determined that the target vehicle moves relative to the ego vehicle. This can trigger a front vehicle moving transition 212. For example, the front vehicle moving transition 212 can cause the vehicle system to change from the Target_Standstill state 210 to a Target_Moving state 214 within the monitor state 208. That is, in both the Target_Standstill state 210 and the Target_Moving state 214 the vehicle system can monitor the target vehicle in one or more respects (e.g., based on sensor output). For example, in the Target_Moving state 214 the vehicle system can monitor the location, speed, and/or acceleration of the target vehicle. In some implementations, the vehicle system can determine in the Target_Moving state 214 that the moving target vehicle never exceeds a threshold acceleration and that the target vehicle instead stops within a predefined range from the ego vehicle. For example, this scenario can involve the target vehicle rolling forward or backward some distance and then stopping. In some implementations, such a scenario may not give rise to the need to issue any alert to the driver of the ego vehicle. However, the vehicle system can perform one or more actions in responses. In some implementations, the determination regarding the target vehicle can trigger a transition 216. The transition 216 can correspond to a determination that the target vehicle stopped within range. For example, the transition 216 can cause the vehicle system to change from the Target_Moving state 214 to the Target_Standstill state 210 within the monitor state 208.

In each of the Target_Moving state 214 and the Target_Standstill state 210 the vehicle system can monitor the ego vehicle in one or more regards. In some implementations, the vehicle system can determine based on the acceleration control 130 (FIG. 1A), or another component of the ego vehicle (e.g., a sensor), that the ego vehicle moves. Such a determination can trigger one or more actions. In some implementations, an ego vehicle moved transition 218 can be triggered. For example, the ego vehicle moved transition 218 can cause the vehicle system to change from either of the Target_Moving state 214 or the Target_Standstill state 210 within the monitor state 208, to the standby state 204.

On the other hand, if the vehicle system determines in the Target_Moving state 214 that a criterion for a drive-off event is met, then one or more actions can be performed. In some implementations, the criterion for the drive-off event takes into account whether a distance between the ego and target vehicles exceeds a threshold distance. In this example, it is assumed that the occurrence of such a distance between the ego and target vehicles warrants the generation of some kind of alert to the driver of the ego vehicle. In some implementations, this determination of the occurrence of the scenario corresponding to the criterion for the drive-off event being met can trigger a transition 220. For example, the transition 220 can cause the vehicle system to change from the monitor state 208 to an alert state 222.

In some implementations, the criterion for the drive-off event takes into account whether an acceleration of the target vehicle exceeds a threshold acceleration. In this example, it is assumed that the occurrence of such an acceleration by the target vehicle, regardless of the current distance between the ego and target vehicles, warrants the generation of some kind of alert to the driver of the ego vehicle. In some implementations, this determination of the occurrence of the scenario corresponding to the criterion for the drive-off event being met can trigger the transition 220. For example, the transition 220 can cause the vehicle system to change from the monitor state 208 to an alert state 222.

The criterion for the drive-off event can instead or additionally include one or more other considerations. In some implementations, the criterion for the drive-off event can comprise that a brake pedal of the ego vehicle is depressed (e.g., by actuating the brake control 128 in FIG. 1A). That is, if the driver of the ego vehicle is not currently pressing the brake pedal, then the ego vehicle may be in the process of moving forward (e.g., toward the target vehicle) and it may not be prudent to issue an alert. As such, the alert(s) can be, but is not necessarily, inhibited upon determining that the brake pedal is not depressed. On the other hand, if the driver is currently pressing the brake pedal, then the alert(s) can be generated in some circumstances.

One or more other considerations can be taken into account in determining whether the lack of depression of the brake pedal should inhibit the alert. In some implementations, the vehicle may remain stationary also when the driver is not pressing down the brake pedal and in such situations the system may not inhibit the alert in that situation (e.g., to instead allow the traffic drive-off system 152 (FIG. 1B) to generate the alert(s)). For example, the vehicle dynamic system 132 in FIG. 1A may be holding the vehicle at standstill also when the brake pedal is not being depressed; as such, the alert may then not be inhibited.

In one or more states of the state diagram 200, the vehicle system can assess whether and to what extent the driver of the ego vehicle is distracted. For example, this can be done by the driver distraction system 154 (FIG. 1B). In some implementations, a distraction level selected from among multiple distraction levels can be assigned to the driver based on the determination. For example, a new determination of driver distraction, and an updating of the assigned distraction level if necessary, can be performed at regular intervals, based on some triggering event, or at random times.

In the alert state 222, the vehicle system can perform one or more actions. At a state 224 within the alert state 222 the vehicle system can take into account the distraction level that is currently associated with the driver. For example, the distraction level assigned to the driver can be any of the distraction levels 162 (FIG. 1B). In some implementations, based on the vehicle system determining that a distraction level 226 currently applies to the driver, the vehicle system can enter a Visual_Alert state 228. The Visual_Alert state 228 can involve selecting one of the alert levels 158 (FIG. 1B) that corresponds to a visual alert. For example, the visual alert can be generated using the visual interface 116 (FIG. 1A).

The generated alert may prompt the driver of the ego vehicle to take action. For example, the driver can actuate the acceleration control 130 (FIG. 1A) so that the ego vehicle begins moving forward. Upon the vehicle system detecting that the vehicle moves, one or more actions can be performed. In some implementations, this can trigger a transition 230. For example, the transition 230 can cause the vehicle system to change from the alert state 222 to the suspended state 202. In some implementations, if the vehicle does not begin moving after an alert is generated, a timeout condition can also or instead trigger the transition 230.

If the vehicle does not begin moving after the alert (in this example, a visual alert) is generated, one or more actions can be taken. In some implementations, a timeout transition 232 to another state can occur. The timeout transition 232 can be associated with a shorter trigger time than the transition 230. For example, the timeout transition 232 can cause the vehicle system to change from the Visual_Alert state 228 to an Audible_Alert state 234. The Audible_Alert state 234 can involve selecting one of the alert levels 158 (FIG. 1B) that corresponds to an audible alert. For example, the audible alert can be generated using the audio interface 118 (FIG. 1A). That is, in this example the timeout transition 232 causes another alert level (here, the Audible_Alert state 234) to be selected based on a timeout event after an alert level (here, the Visual_Alert state 228) is selected, the other alert level not selected based on the camera output.

On the other hand, if a different distraction level than the distraction level 226 had been assigned to the driver at the time when the vehicle system enters the alert state 222, one or more different actions may instead or additionally have been performed. The vehicle system can determine that a distraction level 236 is assigned to the driver. In some implementations, this can result in selecting a different alert level (e.g., from among the alert levels 158 in FIG. 1B). For example, the vehicle system can then at the state 224 select the Audible_Alert state 234. In some implementations, the distraction level 236 can be considered to be a higher distraction level than the distraction level 226. For example, taking into account the driver's higher determined distraction level in this example can allow the vehicle system to generate the alert associated with the Audible_Alert state 234, rather than first generating the alert associated with the Visual_Alert state 228 and then proceeding through the timeout transition 232.

The above examples illustrate that a computer-implemented method can include: determining, by a computer system (e.g., the traffic drive-off system 152 in FIG. 1B) of a first vehicle, that a traffic standstill criterion is met (e.g., in one of the scenarios 160 in FIG. 1B), the traffic standstill criterion including that the first vehicle is stationary in traffic and that a second vehicle immediately in front of the first vehicle is also stationary. The method can include receiving, by the computer system, a camera output relating to a driver of the first vehicle, the camera output generated by a camera (e.g., the camera 112 of the sensors 102 in FIG. 1A) positioned in a passenger cabin of the first vehicle. The method can include assigning, by the computer system (e.g., by the driver distraction system 154 in FIG. 1B, by way of the integration system 156), a distraction level (e.g., the distraction level 226 or 236 of FIG. 2) for the driver based on the camera output, the distraction level selected from among multiple distraction levels (e.g., the distraction levels 162 in FIG. 1B). The method can include determining, by the computer system, that a criterion for a drive-off event (e.g., in one of the scenarios 160 in FIG. 1B) is met. The method can include selecting, by the computer system (e.g., the traffic drive-off system 152 in FIG. 1B) and based on the distraction level assigned for the driver, a first alert level (e.g., the Visual_Alert state 228 or the Audible_Alert state 234 in FIG. 2) from among multiple alert levels (e.g., the alert levels 158 in FIG. 1B) regarding the drive-off event.

FIGS. 3A-3F schematically show a driver 300 and a passenger compartment 302 of a vehicle. The described examples can be used with one or more other examples described elsewhere herein. In FIG. 3A, the driver 300 is shown from above positioned in a seat 304. For example, the seat 304 can be located in the passenger compartment 302 (FIGS. 3B-3F), such as in a front row thereof.

One or more cameras can be positioned in the passenger compartment 302. In FIG. 3A, cameras 306 and 308 are shown. For example, the camera 306 is placed at a position in front of the driver, including, but not limited to, adjacent an interior rearview mirror in the passenger compartment 302. As another example, the camera 308 is placed at a position behind the driver, including, but not limited to, at a headliner in the passenger compartment 302.

The camera 306 and/or 308 can determine one or more characteristics regarding the driver 300 that are relevant for determining a distraction level. In some implementations, the camera 306 and/or 308 can capture an image of at least part of a head 310 of the driver 300. For example, a head direction 312 can be determined, here schematically represented using an arrow oriented in the same direction as the face of the driver 300. In some implementations, the camera 306 and/or 308 can capture an image of at least part of one or both eyes of the driver 300. For example, an eye gaze direction 314 can be determined, here schematically represented using two arrows originating at the eyes of the driver 300. The head direction 312 and the eye gaze direction 314 can vary independently of each other. Each of the head direction 312 and the eye gaze direction 314 can be expressed using one or more numbers, optionally associated with suitable units. For example, each of the head direction 312 and the eye gaze direction 314 can be characterized using a yaw angle (e.g., rotation about a vertical axis) and a pitch angle (e.g., rotation about a horizontal axis transverse to the direction of the person's face). In some implementations, at least one of the head direction 312 and the eye gaze direction 314 can be expressed as a respective vector relative to a coordinate system. A vehicle system (e.g., the driver distraction system 154 in FIG. 1B) can assign a driver distraction level based on at least one of the head direction 312 or the eye gaze direction 314.

The following examples illustrate how various combinations of the head direction 312 and the eye gaze direction 314 can be associated with different distraction levels. FIGS. 3B-3F schematically show the passenger compartment 302 from above as a dashed rectangle. The driver 300 (FIG. 3A) is omitted in these examples for simplicity, and instead the driver's position in each situation is indicated by the head direction 312 and the eye gaze direction 314. A viewing direction 316, moreover, represents the resulting direction in which the driver 300 is looking based on the head direction 312 and the eye gaze direction 314. In FIG. 3B, the viewing direction 316 indicates that the driver 300 is looking out through a windshield 318 of the passenger compartment 302. In some implementations, this configuration of the viewing direction 316 can be associated with a particular distraction level. For example, this configuration can be associated with a lowest distraction level of the distraction levels 162 (FIG. 1B). In some implementations, the viewing direction 316 in FIG. 3B can be considered a default viewing direction.

In FIG. 3C, the viewing direction 316 indicates that the driver 300 is not looking out through the windshield 318, but rather is looking through a driver side window 320 of the passenger compartment 302. In some implementations, this configuration of the viewing direction 316 can be associated with a particular distraction level. For example, this configuration can be associated with a distraction level higher than (e.g., representing more distraction than) the distraction level in FIG. 3B. An angle or range of angles of the viewing direction 316 can be taken into account, to cause the system to behave differently in one or more ways. In some implementations, a sector 317 is defined corresponding to a range of angles between the default head position (e.g., FIG. 3B) and a side mirror (here the driver's side mirror). If the viewing direction 316 falls within the sector 317 the system may not trigger an alert immediately, despite detecting some level of distraction. For example, the system may instead wait a predefined time (e.g., some number of seconds) before reporting the distraction (e.g., by issuing one or more alerts).

In FIG. 3D, the viewing direction 316 indicates that the driver 300 is not looking out through the windshield 318, but rather is looking toward a front passenger seat 322 of the passenger compartment 302. In some implementations, this configuration of the viewing direction 316 can be associated with a particular distraction level. For example, this configuration can be associated with a distraction level higher than (e.g., representing more distraction than) the distraction level in FIG. 3C. An angle or range of angles of the viewing direction 316 can be taken into account, to cause the system to behave differently in one or more ways. In some implementations, a sector 323 is defined corresponding to a range of angles between the default head position (e.g., FIG. 3B) and a side mirror (here the front passenger's side mirror). If the viewing direction 316 falls within the sector 323 the system may not trigger an alert immediately, despite detecting some level of distraction. For example, the system may instead wait a predefined time (e.g., some number of seconds) before reporting the distraction (e.g., by issuing one or more alerts).

In FIG. 3E, the viewing direction 316 indicates that the driver 300 is not looking out through the windshield 318, but rather is looking toward a lap 324 of the driver 300 (e.g., the driver 300 may be using a phone or other device). In some implementations, this configuration of the viewing direction 316 can be associated with a particular distraction level. For example, this configuration can be associated with a distraction level higher than (e.g., representing more distraction than) the distraction level in FIG. 3C.

In FIG. 3F, the viewing direction 316 indicates that the driver 300 is not looking out through the windshield 318, but rather is looking toward a rear 326 of the passenger compartment 302. In some implementations, this configuration of the viewing direction 316 can be associated with a particular distraction level. For example, this configuration can be associated with a distraction level higher than (e.g., representing more distraction than) the distraction level in FIG. 3E.

Other combinations of the head direction 312 and the eye gaze direction 314 can be associated with one or more of the above distraction levels, or with a different distraction level.

Figure 4A:
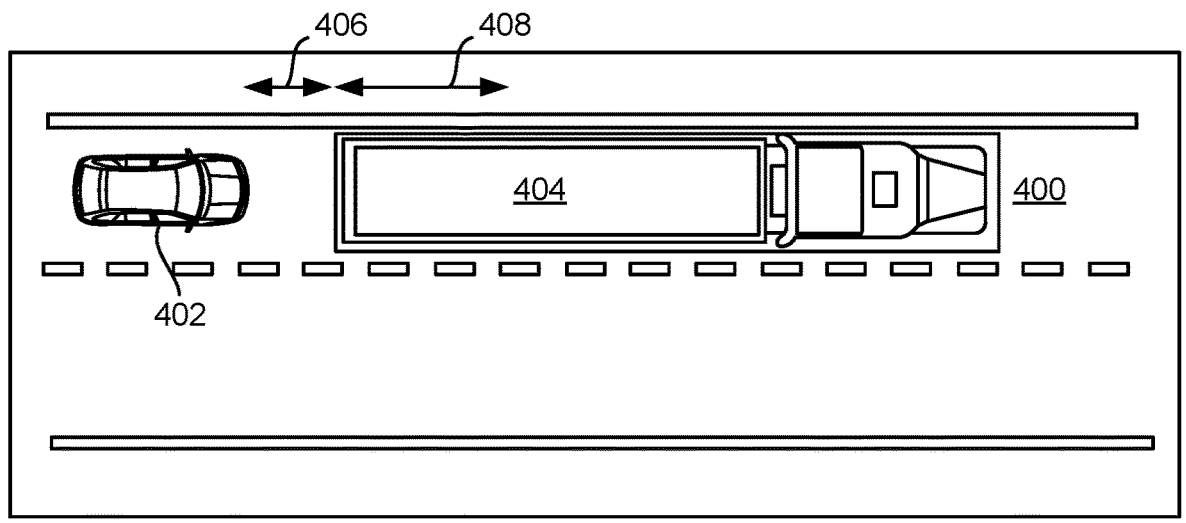
FIGS. 4A-4B show examples relating to traffic on a roadway.
Figure 4B:
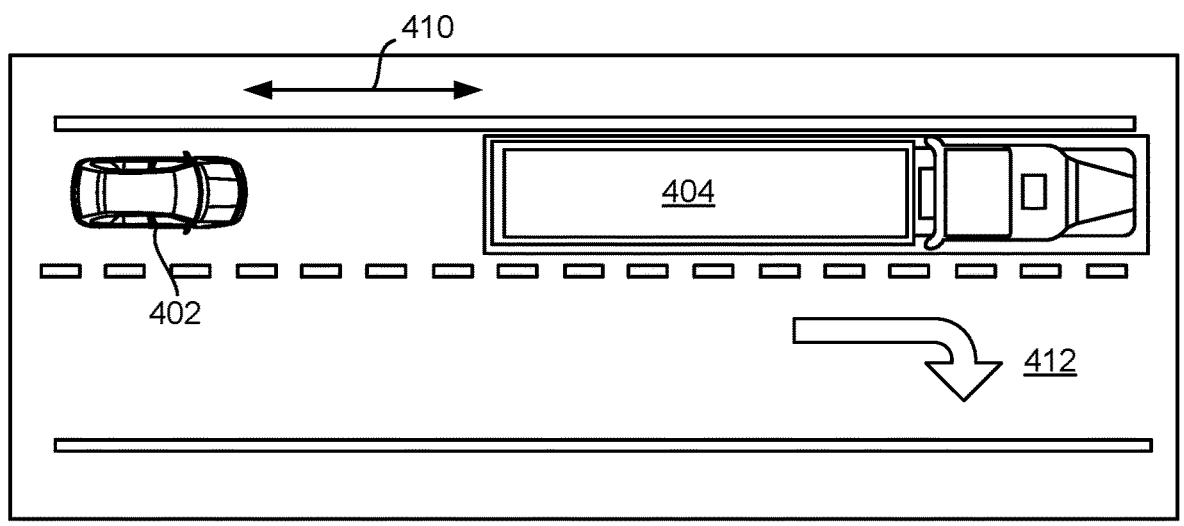

FIGS. 4A-4B show examples relating to traffic on a roadway 400. The described examples can be used with one or more other examples described elsewhere herein. Vehicles 402 and 404 are currently located on the roadway 400 that has one-way traffic proceeding in either of two adjacent lanes. In some implementations, the vehicle 402 can be considered the ego vehicle. For example, the vehicle 402 can be a passenger vehicle (e.g., a sedan). In some implementations, the vehicle 404 can be considered the target vehicle. For example, the vehicle 404 can be a large vehicle (e.g., a truck, a tractor with one or more semi-trailers, or a bus). In the present example, the vehicle system that provides distraction-sensitive traffic drive-off alerts (e.g., the vehicle system 150 in FIG. 1B) does not depend on the detected shape of the vehicle 404, or upon any shape detection being performed. As such, the vehicle 404 is shown as a large vehicle in this example for illustrative purposes only.

FIG. 4A shows that the vehicles 402 and 404 are both stationary on the roadway 400. The vehicles 402 and 404 may have come to a standstill due to a traffic jam, or because of a traffic light. The current example assumes that the vehicle 402 comes to a halt after, or approximately at the same time as, the vehicle 404 becomes stationary. The vehicle 402 has stopped at a position on the roadway 400 such that there is a distance 406 between the vehicles 402 and 404 (e.g., between a front of the vehicle 402 and a rear of the vehicle 404) at the point when a traffic standstill criterion is determined to be met (e.g., by the traffic drive-off system 152 in FIG. 1B). At this point, the vehicle system can register an initial distance corresponding to the distance 406. For example, the initial distance indicates the personal preference of the driver of the vehicle 402 when stopping behind a stationary vehicle. Either or both of the distance 406 and the initial distance can later vary or be varied, as will be exemplified below.

A distance 408 is here indicated beginning at the rear of the vehicle 404 and extending toward the front thereof. The distance 408 represents the length of the vehicle 402. In some implementations, the vehicle system that provides distraction-sensitive traffic drive-off alerts can take into account whether the distance between the vehicles exceeds a threshold distance. For example, the threshold distance can be defined as the initial distance plus the distance 408. As such, a criterion for a drive-off event can take into account whether the distance 406 between the vehicles 402 and 404 exceeds a threshold distance, and the threshold distance can be based at least in part on a length of the vehicle 402. Particularly, the threshold distance can be defined as the initial distance plus the distance 408, wherein the initial distance is defined as the distance between the vehicles 402 and 404 when the traffic standstill criterion is met.

The initial distance can be redefined based on a change in the distance 406 in one or more situations. In some implementations, it can be detected after the vehicles 402 and 404 come to a standstill (e.g., after the traffic standstill criterion is met) but before the vehicle 404 again begins moving forward (e.g., before the criterion for the drive-off event is met), that the vehicle 402 moves relative to the vehicle 404. For example, the driver may have stopped earlier than the point that is the driver's personal preference for the amount of space to leave open. In response to such a determination, the vehicle system can update the initial distance with the distance 406 that has become shorter due to the movement of the vehicle 402. For example, this update can correspond to updating the threshold distance to be taken into account by the criterion for the drive-off event.

On the other hand, in one or more situations the vehicle system may not redefine the initial distance even if the distance 406 changes. In some implementations, it can be detected after the vehicles 402 and 404 come to a standstill (e.g., after the traffic standstill criterion is met) but before the vehicle 404 again begins moving forward (e.g., before the criterion for the drive-off event is met), that the vehicle 404 moves toward the vehicle 402. For example, the driver of the vehicle 404 may allow the vehicle 404 to roll backward some distance when the roadway 400 is uphill, or may drive the vehicle 404 in reverse some distance to create room in front of the vehicle 404. In response to such a determination, the vehicle system may not update the initial distance despite the distance 406 between the vehicles 402 and 404 now being shorter than the initial distance. For example, in this situation the threshold distance being taken into account by the criterion for the drive-off event does not change after the vehicle 404 moves toward the vehicle 402.

In some circumstances, a movement forward by the vehicle 404 will be registered as a criterion for a drive-off event being met. FIG. 4B shows that the vehicle 404 has moved forward with the vehicle 402 remaining stationary so that there is now a distance 410 between the vehicles 402 and 404. The vehicle system (e.g., the traffic drive off system 152 in FIG. 1B) can evaluate the distance 410 with regard to a threshold distance (e.g., as described above). In some implementations, the vehicle system can determine that the criterion for the drive-off event is met if the distance 410 exceeds the threshold distance. For example, with reference again briefly to FIG. 4A, meeting the threshold distance can include that the vehicle 404 moves forward by more than the distance 408.

In some implementations, the criterion for the drive-off event can be deemed to be met without regard to the distance 410. For example, if the vehicle 404 moves forward with an acceleration that exceeds a threshold acceleration, this can also or instead be a basis for the vehicle system to determine that the criterion for the drive-off event is met.

Upon determining that the criterion for the drive-off event is met, the vehicle system can perform one or more actions. In some implementations, the vehicle system (e.g., the traffic drive-off system 152 in FIG. 1B) can select, based on the distraction level assigned for the driver (e.g., by the driver distraction system 154 in FIG. 1B), a first alert level from among multiple alert levels regarding the drive-off event. For example, this can involve generating a visual alert (e.g., in the Visual_Alert state 228 in FIG. 2) and/or an audible alert (e.g., in the Audible_Alert state 234 in FIG. 2).

One or more circumstances can be taken into account. In some implementations, the vehicle system that provides distraction-sensitive traffic drive-off alerts can take into account the type of roadway, highway, or street where the ego vehicle is positioned. For example, the vehicle system can detect (e.g., based on the lidar 110 and/or the camera 112 in FIG. 1A) that the vehicle 402 is in a turn lane 412. This can allow the vehicle system to provide a different type of alert, or to alter the timing of presenting the alert, based on the circumstances of the vehicle 402.

Figure 5:
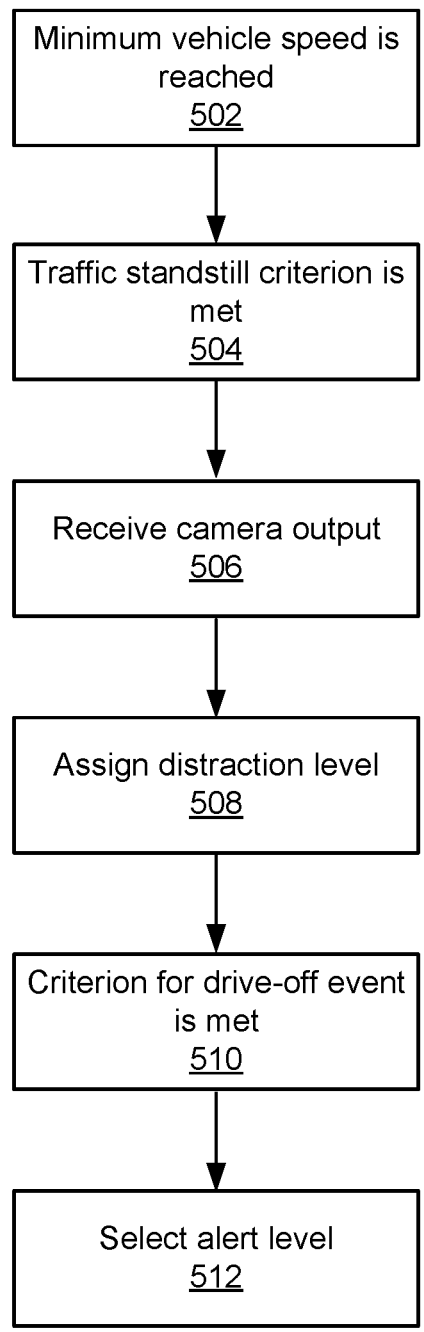
FIG. 5 shows an example of a method.

FIG. 5 shows an example of a method 500. The method 500 can be used together with one or more other examples described herein. More or fewer operations than shown can be performed. Two or more operations can be performed in a different order unless otherwise indicated.

Operation 502 can involve determining whether to suppress one or more alerts. In some implementations, a system can disable the alert(s) when an ego vehicle starts to move or after a timeout. To avoid driver inconvenience and prevent multiple alerts from being generated during a traffic jam, the system can start triggering traffic drive-off alerts only after the ego vehicle speed reaches a specific threshold (e.g., a specific minimum speed). The speed threshold can be evaluated with regard to the time elapsed since generation of the previous alert(s), or since the vehicle was most recently powered on, to name two examples. For example, if the system had triggered an alert and the driver thereafter moved from zero speed to any value less than the threshold, and if the traffic drive-off condition were again met, the system may not trigger any alert(s) in this situation. Rather, the system may resume triggering the alert(s) again when the vehicle speed goes higher than the threshold and the drive-off condition is again met. A similar rule can apply when the driver powers on the ego vehicle: the system may not trigger the alert(s) after power-up unless and until the vehicle speed reaches or exceeds a speed threshold.

Operation 504 can involve determining, by a computer system of a first vehicle (e.g., vehicle 402 in FIGS. 4A-4B), that a traffic standstill criterion is met. The traffic standstill criterion can include that the first vehicle is stationary in traffic and that a second vehicle (e.g., vehicle 404 in FIGS. 4A-4B) immediately in front of the first vehicle is also stationary.

Operation 506 can involve receiving, by the computer system, a camera output relating to a driver of the first vehicle, the camera output generated by a camera (e.g., camera 306 in FIG. 3A) positioned in a passenger cabin of the first vehicle.

Operation 508 can involve assigning, by the computer system, a distraction level for the driver based on the camera output, the distraction level selected from among multiple distraction levels (e.g., the distraction levels 162 in FIG. 1B).

Operation 510 can involve determining, by the computer system, that a criterion for a drive-off event is met (e.g., as described above with reference to FIG. 4B).

Operation 512 can involve selecting, by the computer system and based on the distraction level assigned for the driver, a first alert level from among multiple alert levels (e.g., the alert levels 158 in FIG. 1B) regarding the drive-off event. For example, a first alert level can be selected for a first distraction level (or range of distraction levels); a second alert level can be selected for a second distraction level (or range of distraction levels); and a third alert level can be selected for a third distraction level (or range of distraction levels); and so on. As another example, for a lowest distraction level (e.g., corresponding to essentially no distraction) the system may not issue any alert; by contrast, for all other distraction levels the same alert can be generated. That is, for the other (higher) distraction levels the system selects that alert based on the distraction level being different from the lowest distraction level.

Figure 6:
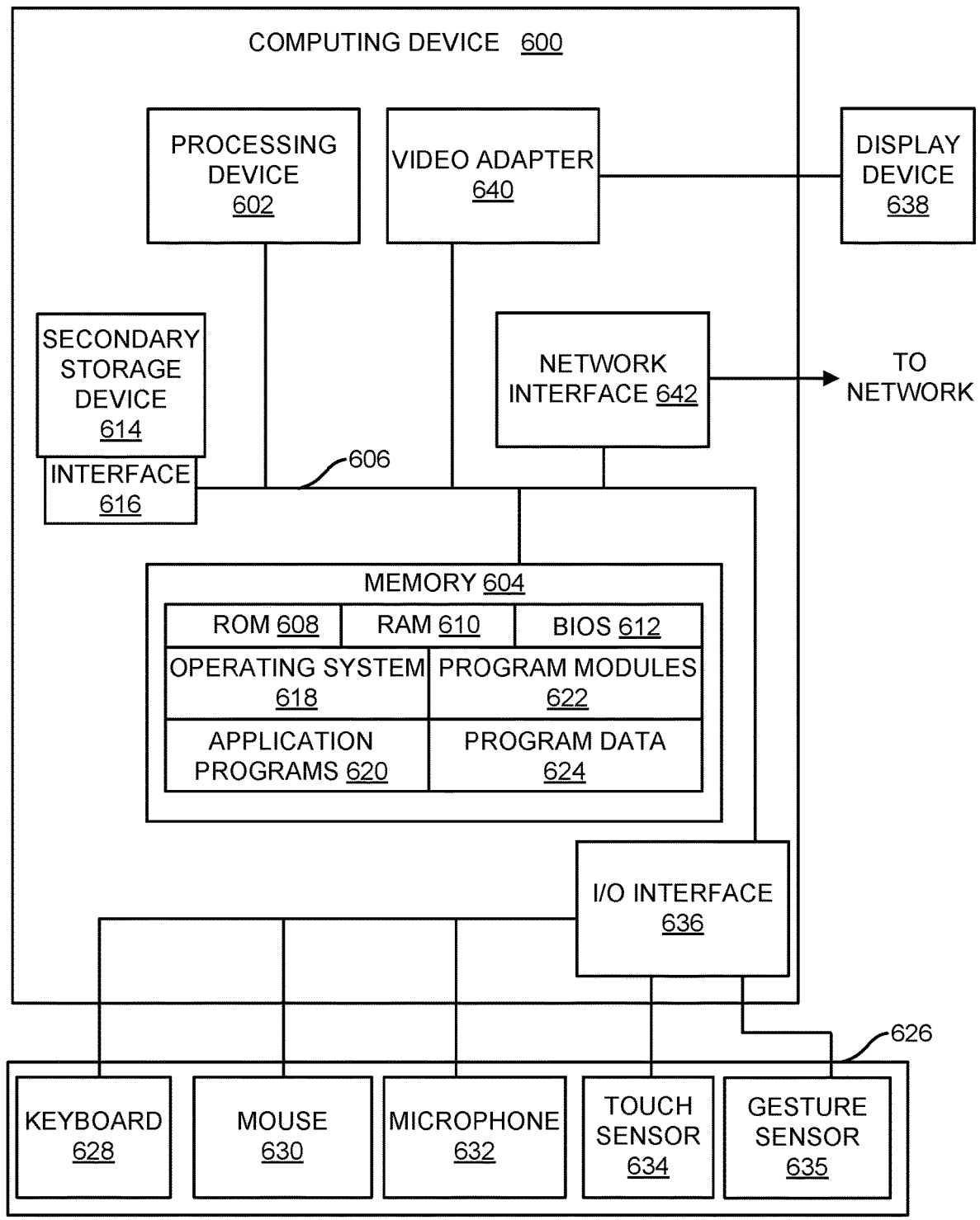
FIG. 6 illustrates an example architecture of a computing device that can be used to implement aspects of the present disclosure.

FIG. 6 illustrates an example architecture of a computing device 600 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 6 can be used to execute the operating system, application programs, and/or software modules (including the software engines) described herein.

The computing device 600 includes, in some embodiments, at least one processing device 602 (e.g., a processor), such as a central processing unit (CPU). A variety of processing devices are available from a variety of manufacturers, for example, Intel or Advanced Micro Devices. In this example, the computing device 600 also includes a system memory 604, and a system bus 606 that couples various system components including the system memory 604 to the processing device 602. The system bus 606 is one of any number of types of bus structures that can be used, including, but not limited to, a memory bus, or memory controller; a peripheral bus; and a local bus using any of a variety of bus architectures.

Examples of computing devices that can be implemented using the computing device 600 include a desktop computer, a laptop computer, a tablet computer, a mobile computing device (such as a smart phone, a touchpad mobile digital device, or other mobile devices), or other devices configured to process digital instructions.

The system memory 604 includes read only memory 608 and random access memory 610. A basic input/output system 612 containing the basic routines that act to transfer information within computing device 600, such as during start up, can be stored in the read only memory 608.

The computing device 600 also includes a secondary storage device 614 in some embodiments, such as a hard disk drive, for storing digital data. The secondary storage device 614 is connected to the system bus 606 by a secondary storage interface 616. The secondary storage device 614 and its associated computer readable media provide nonvolatile and non-transitory storage of computer readable instructions (including application programs and program modules), data structures, and other data for the computing device 600.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 614 and/or system memory 604, including an operating system 618, one or more application programs 620, other program modules 622 (such as the software engines described herein), and program data 624. The computing device 600 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 600 through one or more input devices 626. Examples of input devices 626 include a keyboard 628, mouse 630, microphone 632 (e.g., for voice and/or other audio input), touch sensor 634 (such as a touchpad or touch sensitive display), and gesture sensor 635 (e.g., for gestural input). In some implementations, the input device(s) 626 provide detection based on presence, proximity, and/or motion. In some implementations, a user may walk into their home, and this may trigger an input into a processing device. For example, the input device(s) 626 may then facilitate an automated experience for the user. Other embodiments include other input devices 626. The input devices can be connected to the processing device 602 through an input/output interface 636 that is coupled to the system bus 606. These input devices 626 can be connected by any number of input/output interfaces, such as a parallel port, serial port, game port, or a universal serial bus. Wireless communication between input devices 626 and the input/output interface 636 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 638, such as a monitor, liquid crystal display device, light-emitting diode display device, projector, or touch sensitive display device, is also connected to the system bus 606 via an interface, such as a video adapter 640. In addition to the display device 638, the computing device 600 can include various other peripheral devices (not shown), such as speakers or a printer.

The computing device 600 can be connected to one or more networks through a network interface 642. The network interface 642 can provide for wired and/or wireless communication. In some implementations, the network interface 642 can include one or more antennas for transmitting and/or receiving wireless signals. When used in a local area networking environment or a wide area networking environment (such as the Internet), the network interface 642 can include an Ethernet interface. Other possible embodiments use other communication devices. For example, some embodiments of the computing device 600 include a modem for communicating across the network.

The computing device 600 can include at least some form of computer readable media. Computer readable media includes any available media that can be accessed by the computing device 600. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 600.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
    determining, by a computer system of a first vehicle, that a traffic standstill criterion is met, the traffic standstill criterion including that the first vehicle is stationary in traffic and that a second vehicle immediately in front of the first vehicle is also stationary;
    receiving, by the computer system, a camera output relating to a driver of the first vehicle, the camera output generated by a camera positioned in a passenger cabin of the first vehicle;
    assigning, by the computer system, a distraction level for the driver based on the camera output, the distraction level selected from among multiple distraction levels;
    determining, by the computer system, that a criterion for a drive-off event is met;
    selecting, by the computer system and based on the distraction level assigned for the driver, a first alert level from among multiple alert levels regarding the drive-off event; and
    determining whether an alert suspension criterion is met, the alert suspension criterion taking into account only events since a most recently issued alert.

2. The computer-implemented method of claim 1, wherein the first alert level includes at least one of an audio alert or a visual alert.

3. The computer-implemented method of claim 1, wherein the alert suspension criterion comprises that an alert is suspended provided that the first vehicle has not exceeded a threshold speed since the most recently issued alert.

4. The computer-implemented method of claim 1, wherein the criterion for the drive-off event takes into account whether a distance between the first and second vehicles exceeds a threshold distance.

5. The computer-implemented method of claim 4, wherein the criterion for the drive-off event further comprises that a brake pedal of the first vehicle is depressed.

6. The computer-implemented method of claim 5, further comprising determining that the brake pedal is no longer depressed, and inhibiting an alert unless a vehicle dynamic system is holding the first vehicle at a standstill.

7. The computer-implemented method of claim 1, further comprising determining, based on the camera output and in response to determining that the second vehicle meets the criterion for the drive-off event, a head direction of the driver and an eye gaze direction for the driver, wherein the distraction level is assigned based on the head direction and the eye gaze direction.

8. The computer-implemented method of claim 7, wherein a first distraction level is assigned for the driver in response to the head direction and the eye gaze direction indicating that the driver is currently not looking through a windshield of the first vehicle and is looking through a driver side window of the first vehicle.

9. The computer-implemented method of claim 8, wherein a second distraction level is assigned for the driver in response to the head direction and the eye gaze direction indicating that the driver is currently not looking through the windshield of the first vehicle and is looking toward a front passenger seat of the first vehicle or toward a lap of the driver, wherein the second distraction level represents more distraction than the first distraction level.

10. The computer-implemented method of claim 9, wherein a third distraction level is assigned for the driver in response to the head direction and the eye gaze direction indicating that the driver is currently not looking through the windshield of the first vehicle and is looking toward a rear of the first vehicle, wherein the third distraction level represents more distraction than the second distraction level.

11. The computer-implemented method of claim 1, wherein the criterion for the drive-off event takes into account whether an acceleration of the second vehicle exceeds a threshold acceleration without regard to a distance between the first and second vehicles.

12. The computer-implemented method of claim 1, further comprising selecting a second alert level based on a timeout event after selecting the first alert level and not based on the camera output, wherein the timeout event reflects that the first vehicle has not moved in response to the criterion for the drive-off event being met, and wherein the second alert level corresponds to a different alert than the first alert level.

13. The computer-implemented method of claim 12, wherein the first alert level corresponds to a visual alert, and wherein the second alert level corresponds to an audible alert.

14. The computer-implemented method of claim 12, wherein the first vehicle is configured to perform a timeout transition from the first alert level to the second alert level based on the timeout event, wherein the timeout event has a first trigger time, wherein the first vehicle is also configured to perform a transition from the first alert level to a suspended state where no alert is generated, wherein the transition to the suspended state has a second trigger time, and wherein the first trigger time is shorter than the second trigger time.

15. The computer-implemented method of claim 1, further comprising taking into account an angle or range of angles of a viewing direction, and based on the angle or range of angles waiting a predefined time before generating an alert.

16. The computer-implemented method of claim 1, wherein for a lowest distraction level no alert is generated, and for all other distraction levels a same type of alert is generated.

17. The computer-implemented method of claim 1, further comprising determining whether to suppress at least one alert.

18. The computer-implemented method of claim 17, wherein the determination whether to suppress the alert comprises taking into account a speed of the first vehicle.

19. A computer-implemented method comprising:
determining, by a computer system of a first vehicle, that a traffic standstill criterion is met, the traffic standstill criterion including that the first vehicle is stationary in traffic and that a second vehicle immediately in front of the first vehicle is also stationary;
receiving, by the computer system, a camera output relating to a driver of the first vehicle, the camera output generated by a camera positioned in a passenger cabin of the first vehicle;
assigning, by the computer system, a distraction level for the driver based on the camera output, the distraction level selected from among multiple distraction levels;
determining, by the computer system, that a criterion for a drive-off event is met; and
selecting, by the computer system and based on the distraction level assigned for the driver, a first alert level from among multiple alert levels regarding the drive-off event;
wherein the criterion for the drive-off event takes into account whether a distance between the first and second vehicles when each of the first and second vehicles is standing still exceeds a threshold distance, and wherein the threshold distance is based at least in part on a length of the first vehicle.

20. The computer-implemented method of claim 19, wherein the threshold distance is defined as an initial distance plus the length of the first vehicle, wherein the initial distance is defined as the distance between the first and second vehicles when the traffic standstill criterion is met.

21. The computer-implemented method of claim 20, further comprising determining, after the traffic standstill criterion is met and before the criterion for the drive-off event is met, that the first vehicle moves relative to the second vehicle, and in response updating the threshold distance with a new distance between the first and second vehicles.

22. The computer-implemented method of claim 20, further comprising determining, after the traffic standstill criterion is met and before the criterion for the drive-off event is met, that the second vehicle moves toward the first vehicle, wherein the threshold distance is not updated with a shorter distance between the first and second vehicles.

23. A computer-implemented method comprising:
determining, by a computer system of a first vehicle, that a traffic standstill criterion is met, the traffic standstill criterion including that the first vehicle is stationary in traffic and that a second vehicle immediately in front of the first vehicle is also stationary;
receiving, by the computer system, a camera output relating to a driver of the first vehicle, the camera output generated by a camera positioned in a passenger cabin of the first vehicle;
assigning, by the computer system, a distraction level for the driver based on the camera output, the distraction level selected from among multiple distraction levels;
determining, by the computer system, that a criterion for a drive-off event is met; and
selecting, by the computer system and based on the distraction level assigned for the driver, a first alert level from among multiple alert levels regarding the drive-off event; and
determining whether an alert suspension criterion is met, the alert suspension criterion taking into account only events since the first vehicle was turned on.

24. The computer-implemented method of claim 23, wherein the alert suspension criterion comprises that the alert is suspended provided that the first vehicle has not exceeded a threshold speed since the first vehicle was turned on.

* * * * *